(12) United States Patent
Fujisawa et al.

(10) Patent No.: US 12,393,293 B2
(45) Date of Patent: Aug. 19, 2025

(54) SWITCH SIMULATION DEVICE

(71) Applicant: SUBARU CORPORATION, Tokyo (JP)

(72) Inventors: Hiroshi Fujisawa, Tokyo (JP); Yasunori Sato, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 18/633,793

(22) Filed: Apr. 12, 2024

(65) Prior Publication Data

US 2024/0345672 A1   Oct. 17, 2024

(30) Foreign Application Priority Data

Apr. 14, 2023 (JP) ................................. 2023-066251

(51) Int. Cl.
*G06F 3/039* (2013.01)
*G06F 3/02* (2006.01)

(52) U.S. Cl.
CPC .......... *G06F 3/0393* (2019.05); *G06F 3/0202* (2013.01)

(58) Field of Classification Search
CPC ............................ G06F 3/0393; G06F 3/0202
See application file for complete search history.

(56) References Cited

U.S. PATENT DOCUMENTS 11,226,692 B1 * 1/2022 Su ........................... G06F 3/041
2023/0145244 A1 * 5/2023 Clevorn ................. G06F 3/016
                                                              345/173

FOREIGN PATENT DOCUMENTS

JP       2016-218542 A    12/2016

* cited by examiner

*Primary Examiner* — Afroza Chowdhury
(74) *Attorney, Agent, or Firm* — Finnegan, Henderson, Farabow, Garrett & Dunner, LLP (57) ABSTRACT

A switch simulation device attachable to a touch panel includes a volume switch including a main body having first and second contact points, a head rotatable around a central axis of the main body and movable in the central axis direction, and an internal opening-and-closing unit electrically coupling and uncoupling the first and second contact points in response to movement of the head in the central axis direction, an operation member including a conductive material and coupled to the head to be rotatable and movable integrally with the head, a contact terminal that includes a conductive material, and is electrically coupled to the first contact point and in continuous contact with the operation member regardless of rotation and movement of the operation member, and a first coupler that electrically couples a first region of the touch panel to the second contact point.

8 Claims, 6 Drawing Sheets

FIG. 7

SWITCH SIMULATION DEVICE

CROSS-REFERENCE TO RELATED APPLICATIONS

The present application claims priority from Japanese Patent Application No. 2023-066251 filed on Apr. 14, 2023, the entire contents of which are hereby incorporated by reference.

BACKGROUND OF THE INVENTION

Field of the Invention

The present invention relates to a switch simulation device that simulates a physical switch.

Description of Background Art

For example, Japanese Unexamined Patent Application Publication (JP-A) No. 2016-218542 describes a technology for enabling an operation of a touch panel by operating a switch simulation device that is attached to a surface of the touch panel and that simulates a physical switch. The entire contents of this publication are incorporated herein by reference.

SUMMARY OF THE INVENTION

According to one aspect of the present invention, a switch simulation device attachable to a touch panel includes a volume switch including a main body, a head, and an internal opening-and-closing unit, an operation member including a material having electrical conductivity and coupled to the head of the volume switch, a contact terminal that includes a material having electrical conductivity and is electrically coupled to a first contact point of the volume switch, and a first coupler that electrically couples a first region of a touch panel and a second contact point of the volume switch. The main body of the volume switch has the first contact point and the second contact point, the head of the volume switch rotates relative to the main body around a central axis of the main body and moves relative to the main body in a direction in which the central axis of the main body extends, the internal opening-and-closing unit of the volume switch electrically couples and uncouples the first contact point and the second contact point in response to movement of the head in the direction in which the central axis extends, the operation member rotates and moves integrally with the head, and the contact terminal is in continuous contact with the operation member regardless of rotation of the operation member and movement of the operation member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments will now be described with reference to the accompanying drawings, wherein like reference numerals designate corresponding or identical elements throughout the various drawings.

In the technology disclosed in JP-A No. 2016-218542, for example, when the push operation with a small pushing force is performed on the operation knob is weak, there is a case where the surface of the touch panel is not appropriately pressed by the end of the operation knob, so that the touch panel cannot be appropriately detect the touch. In other words, in the technology disclosed in JP-A No. 2016-218542, an operation performed on the switch simulation device may sometimes not be appropriately reflected on the touch panel, and there is a possibility that the response accuracy of the touch panel with respect to the operation performed on the switch simulation device may deteriorate.

It is desirable to provide a switch simulation device capable of suppressing deterioration in response accuracy of a touch panel.

An embodiment of the disclosure will be described in detail below with reference to the accompanying drawings. Specific dimensions, materials, numerical values, and so forth that are mentioned in the embodiment are merely examples for ease of understanding of the disclosure and do not limit the disclosure unless otherwise specified. Note that, in the present specification and the drawings, elements that have substantially the same functions and configurations are denoted by the same reference signs to omit repeated descriptions thereof, and elements not directly related to the disclosure are not illustrated.

Figure 1:
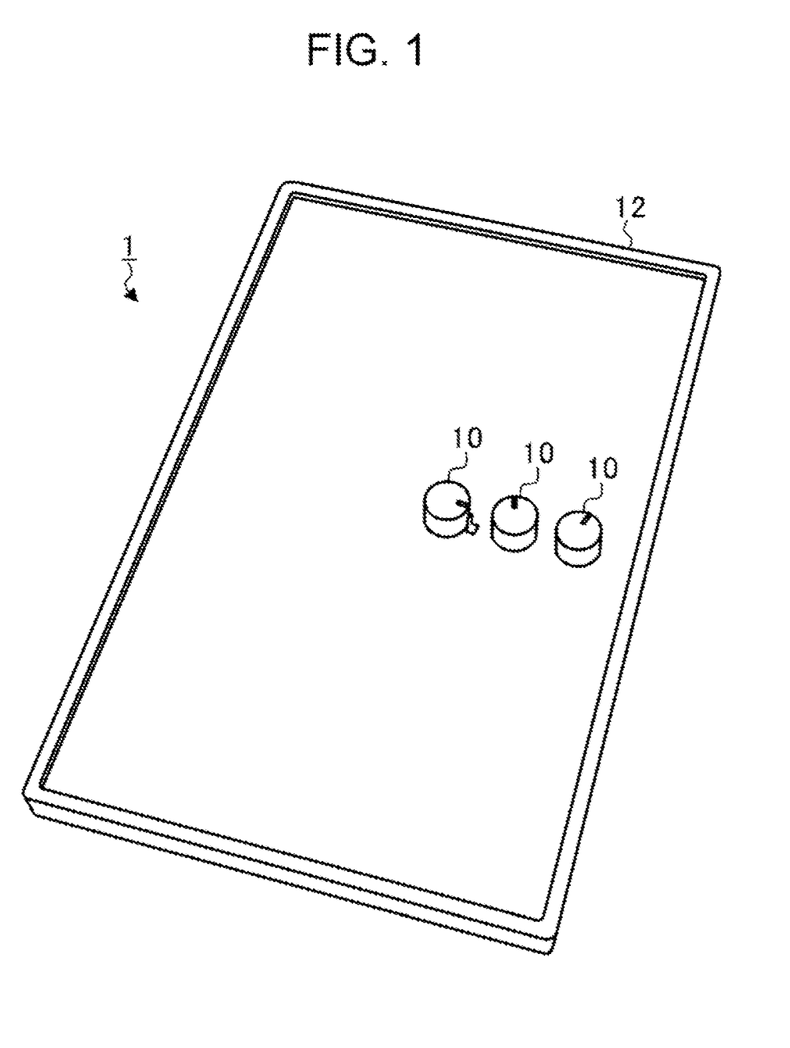
FIG. 1 is a schematic diagram illustrating a configuration of a switch simulation system to which switch simulation devices according to an embodiment of the present invention are applied.

FIG. 1 is a schematic diagram illustrating a configuration of a switch simulation system 1 to which switch simulation devices 10 according to the present embodiment are applied. The switch simulation devices 10 are attachable to a surface of a touch panel 12. FIG. 1 illustrates an example of a state in which the switch simulation devices 10 are attached to the touch panel 12.

Note that, in FIG. 1, the three switch simulation devices 10 are attached to the touch panel 12. However, the number of the switch simulation devices 10 attached to the touch panel 12 is not limited to three and may be one, may be two, or may be four or more.

In response to a touch on the surface of the touch panel 12 by a finger of a person or the like, the touch panel 12 can detect the touch or can determine a touch position on the surface where the touch is performed. The touch panel 12 employs, for example, an electrostatic capacitance method in which a touch position is detected by using a change in electrostatic capacitance corresponding to a touch.

The switch simulation devices 10 are attached to the touch panel 12 such that central axes of the switch simulation devices 10 extend in a direction perpendicular to the surface of the touch panel 12. Although it will be described later, each of the switch simulation devices 10 is configured to perform both a rotation operation and a push operation. The rotation operation is an operation of rotating the switch simulation device 10 about the central axis of the switch simulation device 10. The push operation is an operation of pushing the switch simulation device 10 in a direction in which the central axis of the switch simulation device 10 extends.

Each of the switch simulation devices 10 according to the present embodiment is applicable to, for example, an operation panel of a flight simulator. The flight simulator is a device used for, for example, training or experiencing aircraft control without using an actual aircraft but using a simpler simulation device instead. In order to enhance the reality of control, a flight simulator that accurately reproduces a wide range of physical switches similar to those on an operation panel of an actual aircraft may be used. In this case, however, the operation panel of the flight simulator becomes very expensive, and in addition, the versatility of the flight simulator for a model change of an aircraft to be controlled is reduced.

Accordingly, in order to reduce the manufacturing costs of the flight simulator and increase the versatility, using a touch panel having a simple structure and high versatility as the operation panel of the flight simulator may be considered. In the flight simulator using such a touch panel, a control operation of an aircraft is simulated by performing a touch operation on a planar touch panel.

An operation panel of an actual aircraft includes a large number of various physical switches, levers, meters, and the like. Consequently, it is difficult for a flight simulator using a planar touch panel as an operation panel to appropriately simulate actions such as operating a physical switch or the like on an operation panel of an actual aircraft. Thus, there has been a demand for a device capable of enhancing the reality of control while using a touch panel as an operation panel of a flight simulator.

Accordingly, as one application example of the present embodiment, an operation panel in which the switch simulation devices 10 are attached to the touch panel 12 is used as the operation panel of the flight simulator. Although it will be described later, each of the switch simulation devices 10 is attached and fixed to a predetermined position on the surface of the touch panel 12.

In the switch simulation system 1, the touch panel 12 can be indirectly operated by operating the switch simulation devices 10. For example, a user of the switch simulation system 1, such as a trainee who uses the flight simulator, can obtain the same result as operating the touch panel 12 by operating the switch simulation devices 10, which are physical devices. Thus, the switch simulation system 1 can appropriately simulate, for example, actions such as operating a physical switch of an actual aircraft.

Figure 2:
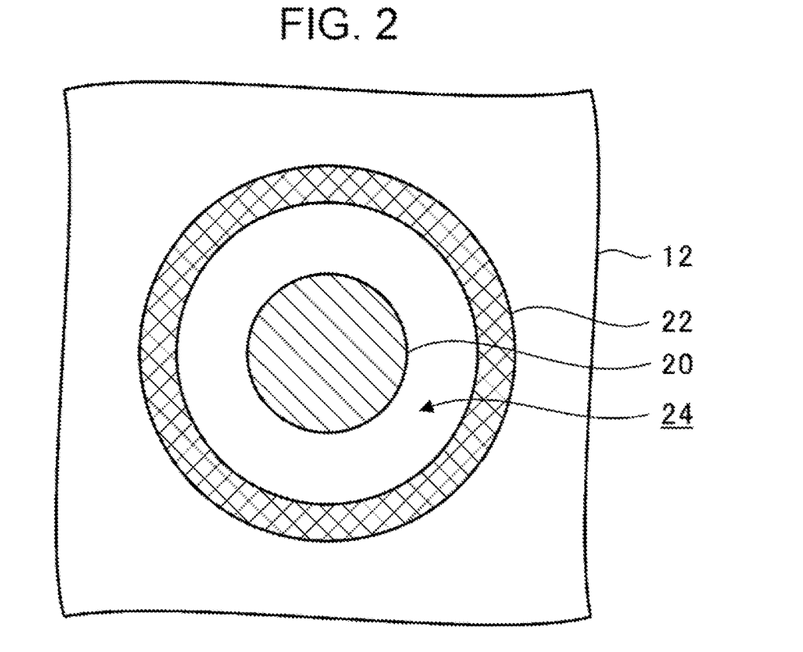
FIG. 2 is a partial plan view illustrating an example of a portion of a surface of a touch panel to which one of the switch simulation devices is attached.

FIG. 2 is a partial plan view illustrating an example of a portion of the surface of the touch panel 12 to which one of the switch simulation devices 10 is attached.

A first region 20 illustrated by hatching as an example in FIG. 2 and a second region 22 illustrated by cross-hatching as an example in FIG. 2 are set on the surface of the touch panel 12. The first region 20 is a center region that corresponds to a center portion of the switch simulation device 10 and is set to have, for example, a circular shape. The second region 22 is a peripheral region that corresponds to an outer edge portion of the switch simulation device 10 and is set to have, for example, an annular shape surrounding the first region 20. In other words, the first region 20 is set so as to be located inside the second region 22, which has an annular shape. An inner diameter of the second region 22 is larger than an outer diameter of the first region 20. A blank region 24 that has an annular shape is formed between an inner peripheral surface of the second region 22 and an outer peripheral surface of the first region 20.

The switch simulation device 10 is attached to the touch panel 12 so as to be positioned above the first region 20 and the second region 22 of the surface of the touch panel 12.

The first region 20 is a region for detecting the push operation that is performed on the switch simulation device 10. The touch panel 12 detects a push operation when, for example, a change in electrostatic capacitance occurs in the first region 20.

The second region 22 is a region for detecting the rotation operation that is performed on the switch simulation device 10. For example, when a change in electrostatic capacitance occurs in a part of the second region 22, the touch panel 12 detects a rotation operation performed at a rotation angle corresponding to the part of the second region 22 in which the change in the electrostatic capacitance has occurred.

Note that the touch panel 12 may detect a push operation when a change in electrostatic capacitance occurs in both the first region 20 and the part of the second region 22.

Figure 3:
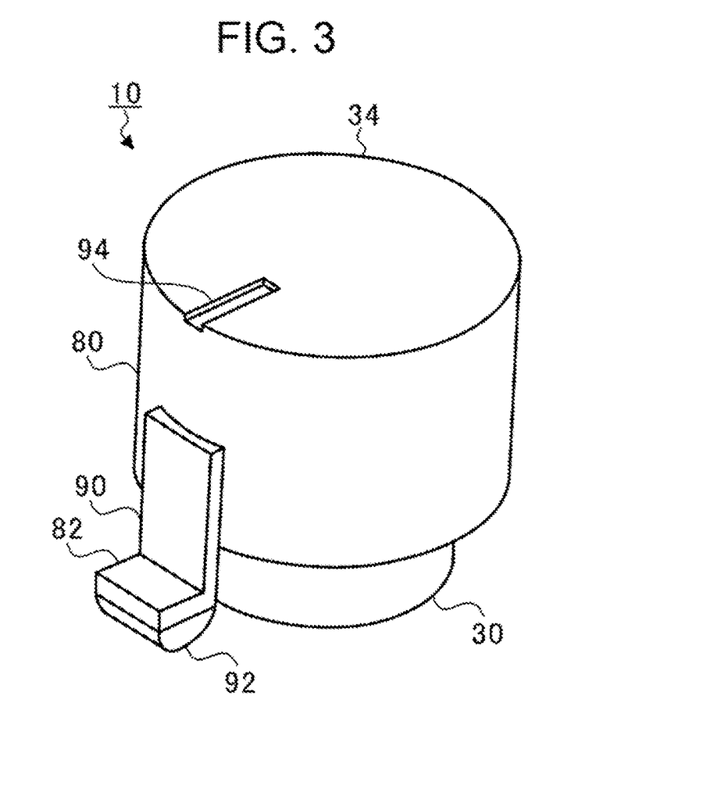
FIG. 3 is a perspective view illustrating an example of a configuration of one of the switch simulation devices.
Figure 4:
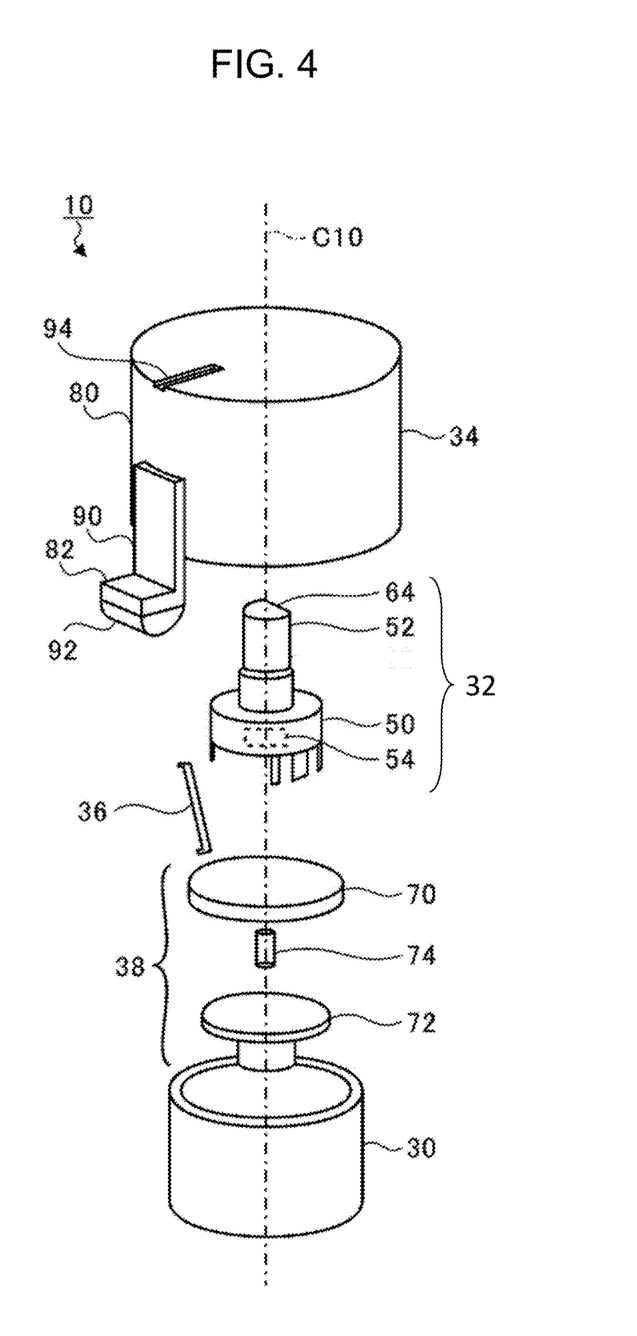
FIG. 4 is an exploded perspective view illustrating an example of the configuration of one of the switch simulation devices.
Figure 5:
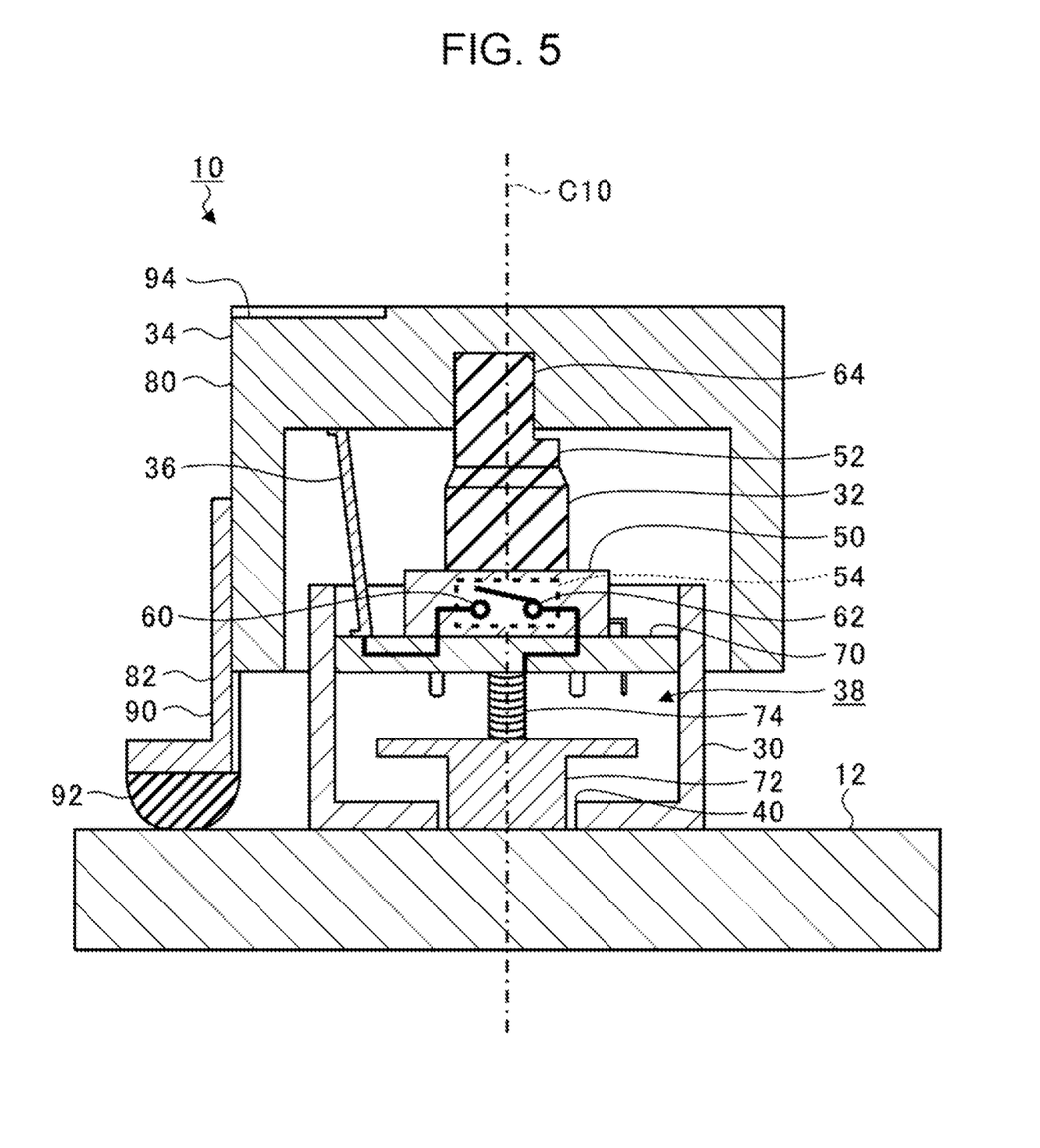
FIG. 5 is a longitudinal sectional view illustrating an example of the configuration of one of the switch simulation devices.

FIG. 3 is a perspective view illustrating an example of the configuration of one of the switch simulation devices 10. FIG. 4 is an exploded perspective view illustrating an example of the configuration of one of the switch simulation devices 10. FIG. 5 is a longitudinal sectional view illustrating an example of the configuration of one of the switch simulation devices 10. In FIG. 4 and FIG. 5, a central axis C10 of the switch simulation device 10 is indicated by a one-dot chain line. The central axis C10 of the switch simulation device 10 corresponds to a central axis of the rotation operation of the switch simulation device 10. The configuration of one of the switch simulation devices 10 will be described below with reference to FIG. 3 to FIG. 5.

As illustrated in FIG. 4, the switch simulation device 10 includes a switch base 30, a volume switch 32, an operation member 34, a contact terminal 36, and a first coupler 38.

The switch base 30 is detachably attached to the surface of the touch panel 12 and has a function of supporting the switch simulation device 10 on the touch panel 12. The switch base 30 is formed in a cylindrical shape. A central axis of the switch base 30 coincides with the central axis C10 of the switch simulation device 10. An upper end of the switch base 30 is open. As illustrated in FIG. 5, a lower end of the switch base 30 extends inward in a radial direction, and a through hole 40 is formed at the center of the lower end so as to extend through the lower end in a direction in which the central axis extends. An opening of the through hole 40 is formed in, for example, a circular shape.

The inner diameter of the through hole 40 of the switch base 30 is equal to or larger than the outer diameter of the first region 20 of the touch panel 12 and is smaller than the inner diameter of the second region 22 of the touch panel 12. An outer diameter of the switch base 30 is equal to or smaller than the inner diameter of the second region 22 of the touch panel 12.

The lower end of the switch base 30 is attached to the surface of the touch panel 12 and fixed in position. For example, the lower end of the switch base 30 is attached to the surface of the touch panel 12 and fixed in position by any coupling element, such as an adhesive or a double-sided adhesive tape. In more detail, the lower end of the switch base 30 is attached to the blank region 24 between the first region 20 and the second region 22 in the touch panel 12.

The volume switch 32 includes a main body 50, a head 52, and an internal opening-and-closing unit 54. A central axis of the volume switch 32, a central axis of the main body 50, and a central axis of the head 52 coincide with the central axis C10 of the switch simulation device 10.

The main body 50 of the volume switch 32 is formed in, for example, a substantially columnar shape. As illustrated in FIG. 5, the main body 50 has a first contact point 60 and a second contact point 62 therein. The first contact point 60 and the second contact point 62 are each coupled to one of pins that are exposed to the outside from the inside of the main body 50.

The head 52 is disposed so as to project upward from an upper surface of the main body 50 and coupled to the main body 50. The head 52 is made of, for example, an insulating material such as a synthetic resin. Part of an upper end of the head 52 in a circumferential direction has a cutout 64 that is formed so as to be recessed inward in the radial direction. For example, as illustrated in FIG. 4, the cutout 64 is formed such that the shape of the upper end of the head 52 in plan view when the upper end of the head 52 is viewed from above is a substantially semicircular shape or the like.

The head 52 is configured to rotate relative to the main body 50 around the central axis of the main body 50 and to be movable relative to the main body 50 in a direction in which the central axis of the main body 50 extends. The circumference of the central axis will hereinafter sometimes be referred to as "around the central axis", and the direction in which the central axis extends will hereinafter sometimes be referred to as the "central axis direction".

Although it will be described later, when the rotation operation is performed on the switch simulation device 10, the head 52 of the volume switch 32 rotates around the central axis with respect to the main body 50. When the push operation is performed on the switch simulation device 10, the head 52 of the volume switch 32 moves in the central axis direction with respect to the main body 50.

Note that the volume switch 32 may be configured such that, when the head 52 is rotated around the central axis with respect to the main body 50, the rotation angle is held in a stepwise manner and temporarily for each predetermined rotation angle. As a result, when the rotation operation is performed on the switch simulation device 10, a clicking sensation can be provided to an operator for each of the predetermined rotation angles.

The volume switch 32 may be configured to generate, like a tactile switch, a predetermined clicking sensation, that is, tactile feedback when the head 52 is pushed in a direction in which the head 52 is inserted into the main body 50. As a result, when the push operation is performed on the switch simulation device 10, a sensation of the push operation can be provided to the operator.

The volume switch 32 may be configured such that, when the head 52 is released from the pushing force in the direction in which the head 52 is inserted into the main body 50, the head 52 moves in a direction in which the head 52 projects from the main body 50 in such a manner as to return to its original position.

As illustrated in FIG. 5, the internal opening-and-closing unit 54 is provided inside the main body 50. The internal opening-and-closing unit 54 is capable of switching, in response to movement of the head 52 in the central axis direction, between a state in which the first contact point 60 and the second contact point 62 are electrically coupled to each other and a state in which the first contact point 60 and the second contact point 62 are electrically uncoupled from each other.

In more detail, in a state where the head 52 is not pushed against the main body 50, the internal opening-and-closing unit 54 electrically uncouples the first contact point 60 and the second contact point 62 from each other. In contrast, in a state where the head 52 is pushed down with respect to the main body 50 and where the amount of movement of the head 52 is equal to or greater than a predetermined movement amount, the internal opening-and-closing unit 54 electrically couples the first contact point 60 and the second contact point 62 to each other. Note that the predetermined movement amount may be set to a threshold at which a clicking sensation is generated when the head 52 is pushed down with respect to the main body 50.

The first coupler 38 includes a switch substrate 70, a touch member 72, and a biasing member 74. The switch substrate 70, the touch member 72, and the biasing member 74 are accommodated inside the switch base 30. A central axis of the switch substrate 70, a central axis of the touch member 72, and a central axis of the biasing member 74 coincide with the central axis of the switch simulation device 10.

The switch substrate 70 is formed in a plate-like shape. The switch substrate 70 is supported by an inner surface of the switch base 30. The volume switch 32 is disposed on the switch substrate 70. In more detail, the main body 50 of the volume switch 32 is coupled to the switch substrate 70. The switch substrate 70 supports the volume switch 32.

The touch member 72 is made of a material having electrical conductivity. The touch member 72 is formed in, for example, a columnar shape. An outer diameter of a lower end of the touch member 72 is equal to or smaller than the outer diameter of the first region 20 in the touch panel 12.

The lower end of the touch member 72 is in contact with the surface of the touch panel 12. In more detail, in a state in which the lower end of the switch base 30 is attached and fixed to the blank region 24 of the touch panel 12, the lower end of the touch member 72 is in continuous contact with the first region 20 of the touch panel 12.

The biasing member 74 is, for example, a spring. The biasing member 74 is made of a material having electrical conductivity. The biasing member 74 is disposed between the switch substrate 70 and the touch member 72. An upper end of the biasing member 74 is coupled to the switch substrate 70. A lower end of the biasing member 74 is coupled to an upper end of the touch member 72. The biasing member 74 biases the touch member 72 in a direction in which the touch member 72 is pressed against the touch panel 12.

The switch substrate 70 has an electrical path that is formed so as to electrically couple the second contact point 62 of the volume switch 32 and the biasing member 74 to each other. For example, among the pins of the main body 50 of the volume switch 32, the pin coupled to the second contact point 62 is coupled to an electrical circuit that is coupled to the biasing member 74 on the switch substrate 70.

In this manner, the first coupler 38 electrically couples the first region 20 of the touch panel 12 and the second contact point 62 of the volume switch 32 to each other.

The operation member 34 is made of a material having electrical conductivity. The operation member 34 is coupled to the head 52 of the volume switch 32 so as to be rotatable and movable integrally with the head 52. The operation member 34 includes a cover 80 and a second coupler 82.

The cover 80 is mounted on the head 52 of the volume switch 32 so as to cover the volume switch 32. In more detail, the cover 80 is formed in a cylindrical shape having a closed upper end and an open lower end. A central axis of the cover 80 coincides with the central axis of the switch simulation device 10.

A recess is formed in an inner surface of the upper end of the cover 80 so as to correspond to the cutout 64 of the head 52, and the cutout 64 of the head 52 is fitted into the recess. As a result, the cover 80 can move integrally with the head 52. The cover 80 is made of a material having electrical conductivity.

The second coupler 82 is provided in such a manner as to project downward from the cover 80, that is, so as to project from the cover 80 toward the touch panel 12. The second coupler 82 is located outside the switch base 30 in the radial direction. The second coupler 82 includes an arm 90 and a contact member 92.

The arm 90 extends downward from the cover 80. A lower end of the arm 90 is bent and projects outward in the radial direction of the cover 80. The arm 90 is made of a material having electrical conductivity.

The contact member 92 is disposed on a lower surface of the lower end of the arm 90. The contact member 92 is an end of the second coupler 82. The contact member 92 is made of, for example, a material such as silicone rubber or electrically conductive fiber that has electrical conductivity and flexibility.

The contact member 92 of the second coupler 82 is in contact with the surface of the touch panel 12. In more detail, in a state where the lower end of the switch base 30 is attached and fixed to the blank region 24 of the touch panel 12, the contact member 92 is in continuous contact with a part of the second region 22 of the touch panel 12.

In this manner, the second coupler 82 electrically couples the part of the second region 22 of the touch panel 12 and the cover 80 to each other. When the operation member 34 rotates, the contact member 92 of the second coupler 82 is maintained in contact with the second region 22 of the touch panel 12.

When the push operation is performed on the switch simulation device 10, the operation member 34 is pushed down and moves downward in the central axis direction. As a result, the end of the second coupler 82, that is, the contact member 92 also moves downward and is pressed against the surface of the touch panel 12. Here, the contact member 92 is configured to be deformed in response to movement of the operation member 34 in the central axis direction. For example, when the cover 80 is pushed in a direction toward the touch panel 12, the contact member 92 is pressed so as to be deformed between the arm 90 and the touch panel 12.

Thus, in the switch simulation device 10, even in a state where the second coupler 82 is in continuous contact with the part of the second region 22 of the touch panel 12, the second coupler 82 can move up and down together with the operation member 34 with a certain allowance, and thus, the push operation may be performed on the operation member 34 without being hindered.

An upper surface of the cover 80 is provided with a direction indicator 94 that indicates a rotation amount of the rotation operation that is performed on the switch simulation device 10. The direction indicator 94 is formed of, for example, a groove that is recessed downward from the upper surface of the cover 80. The direction indicator 94 is provided at a position above the second coupler 82.

The contact terminal 36 is formed in, for example, a bar-like shape. A lower end of the contact terminal 36 is coupled to the switch substrate 70. An upper end of the contact terminal 36 is in contact with the inner surface of the upper end of the cover 80. The contact terminal 36 extends obliquely upward from the switch substrate 70 toward the cover 80. In more detail, the contact terminal 36 extends so as to be inclined with respect to the central axis of the switch simulation device 10 in a direction in which the upper end of the contact terminal 36 is relatively distant from the central axis compared to the lower end.

The lower end of the contact terminal 36 is, for example, bent outward in the radial direction of the switch simulation device 10. In the contact terminal 36, a lower surface of the lower end, which is bent, is coupled to the switch substrate 70. The upper end of the contact terminal 36 is, for example, bent outward in the radial direction of the switch simulation device 10. In the contact terminal 36, an upper surface of the upper end, which is bent, is in contact with the inner surface of the upper end of the cover 80.

The contact terminal 36 is made of a material having electrical conductivity. The contact terminal 36 may be made of a material such as a metal that has relatively high rigidity.

The switch substrate 70 has an electrical path that is formed so as to electrically couple the first contact point 60 of the volume switch 32 and the contact terminal 36 to each other. For example, among the pins of the main body 50 of the volume switch 32, the pin coupled to the first contact point 60 is coupled to an electrical circuit that is coupled to the contact terminal 36 on the switch substrate 70.

In this manner, the contact terminal 36 is electrically coupled to the first contact point 60 of the volume switch 32 and is in contact with the inner surface of the cover 80 of the operation member 34 like a train pantograph. Although the upper end of the contact terminal 36 is in elastic contact with the inner surface of the cover 80 of the operation member 34, the upper end is not fixed to the inner surface. As a result, the contact terminal 36 can be in continuous contact with the cover 80 of the operation member 34 regardless of rotation of the operation member 34 around the central axis and the movement of the operation member 34 in the central axis direction.

Next, an effect relating to the rotation operation of each of the switch simulation devices 10 will be described. As described above, the operation member 34 is made of a material having electrical conductivity, and the contact member 92 is in continuous contact with the part of the second region 22 of the touch panel 12. Thus, the part of the second region 22 of the touch panel 12 and the operation member 34 are always in a conductive state. The conductive state is a state of being electrically coupled.

As illustrated in FIG. 5, when a person is not in contact with the operation member 34, a change in the electrostatic capacitance does not occur in the part of the second region 22 even though the part of the second region 22 of the touch panel 12 and the operation member 34 are in the conductive state. In other words, in this case, although the operation member 34 is in continuous contact with the part of the second region 22, the touch panel 12 does not detect the rotation operation.

Figure 6:
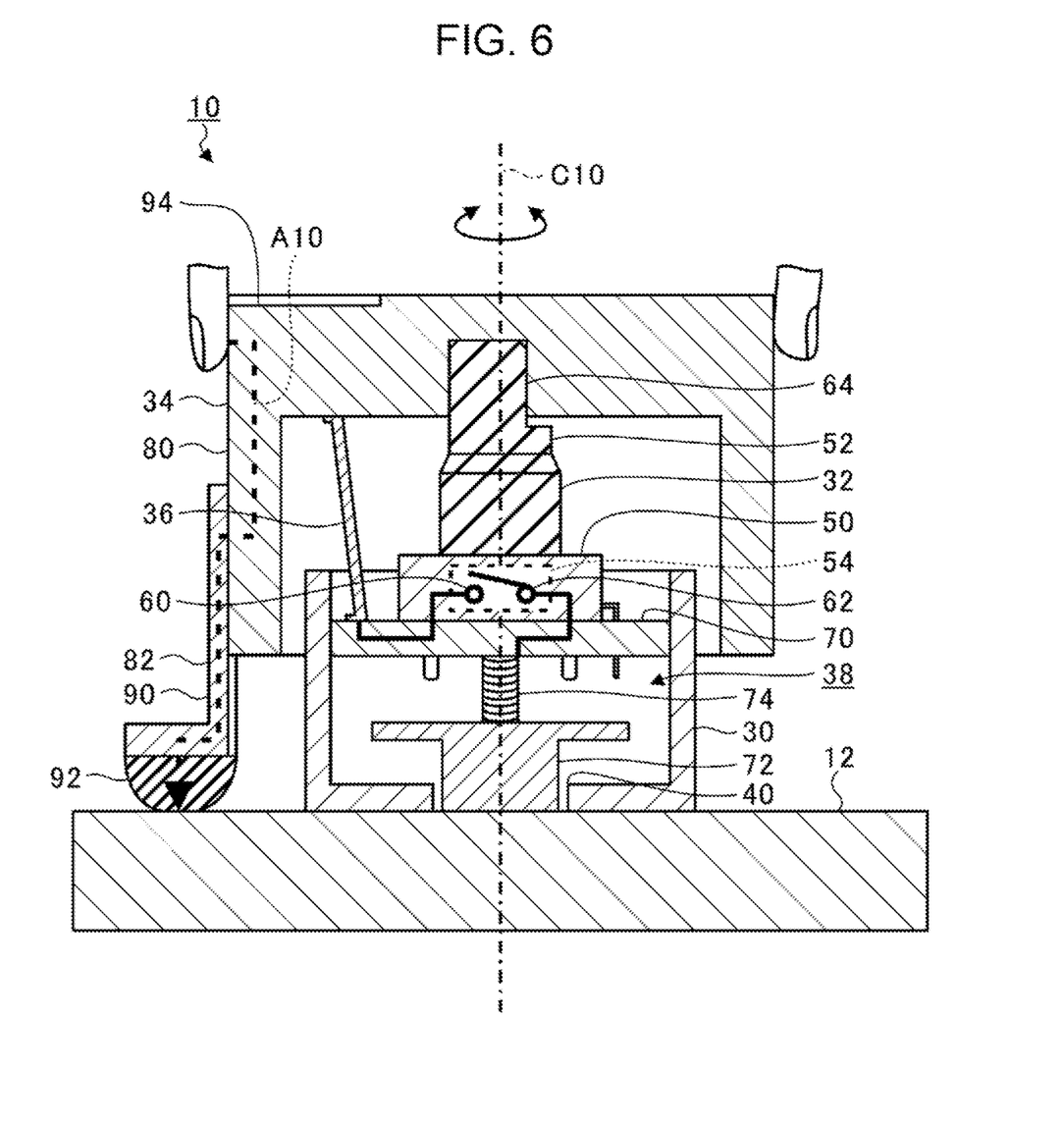
FIG. 6 is a longitudinal sectional view illustrating an effect when a rotation operation is performed on one of the switch simulation devices.

FIG. 6 is a longitudinal sectional view illustrating an effect when the rotation operation is performed on one of the switch simulation devices 10. FIG. 6 illustrates a case in which a person pinches the cover 80 of the operation member 34 by using their fingers so as to perform the rotation operation.

Since the part of the second region 22 of the touch panel 12 and the operation member 34 are always in the conductive state, when a person touches the cover 80 of the operation member 34, a current path that is indicated by a dashed arrow A10 as an example in FIG. 6 is formed. In other words, the current path sequentially coupling the person, the cover 80, the arm 90, the contact member 92, and the second region 22 of the touch panel 12 to one another is formed. As a result, a change in the electrostatic capacitance occurs in the part of the second region 22 of the touch panel 12 with which the contact member 92 is in contact. In response to this, the touch panel 12 detects the rotation angle corresponding to the part, with which the contact member 92 is in contact, in response to the change in the electrostatic capacitance of the part with which the contact member 92 is in contact.

In addition, when the person rotates the cover 80 of the operation member 34, the second coupler 82 performs a rotational movement around the central axis of the cover 80 along with the rotation of the cover 80. As a result, the position in the second region 22 of the touch panel 12 at which the contact member 92 is in contact with the surface of the touch panel 12 changes along with the rotation of the cover 80.

When the cover 80 is rotated, the person keeps touching the cover 80, and thus, the position in the second region 22 at which the contact member 92 is in contact with the surface of the touch panel 12 changes in a state in which the current path indicated by the dashed arrow A10 as an example in FIG. 6 is formed. As the position in the second region 22 at which the contact member 92 is in contact with the surface of the touch panel 12 changes, the position in the second region 22 at which a change in the electrostatic capacitance occurs also changes. Accordingly, the touch panel 12 detects, in response to a change of the position at which a change in the electrostatic capacitance occurs, the most recent rotation angle corresponding to the part with which the contact member 92 is currently in contact.

When the fingers that have been in contact with the operation member 34 are released from the operation member 34, the current path indicated by the dashed arrow A10 as an example in FIG. 6 is no longer formed. As a result, a change in the electrostatic capacitance does not occur in the second region 22 of the touch panel 12. Consequently, the touch panel 12 does not detect the rotation angle.

Next, an effect relating to the push operation of each of the switch simulation devices 10 will be described. As described above, the touch member 72 of the first coupler 38 is in continuous contact with the first region 20 of the touch panel 12. In addition, when the operation member 34 is not pushed down and the head 52 of the volume switch 32 is not pressed downward, the internal opening-and-closing unit 54 of the volume switch 32 is in an open state. When the operation member 34 is pushed down and the head 52 of the volume switch 32 is pressed in a direction in which the head 52 is inserted into the main body 50, that is, downward, the internal opening-and-closing unit 54 of the volume switch 32 is brought into a closed state.

As illustrated in FIG. 5, when the internal opening-and-closing unit 54 of the volume switch 32 is in the open state, the first region 20 of the touch panel 12 and the operation member 34 are in a non-conductive state. The non-conductive state is a state of being not electrically coupled.

In the non-conductive state, since the internal opening-and-closing unit 54 interrupts electrical coupling between the operation member 34 and the first region 20 of the touch panel 12, a change in the electrostatic capacitance does not occur in the first region 20 even if a person touches the operation member 34. In other words, when the internal opening-and-closing unit 54 is in the open state, the touch panel 12 does not detect the push operation even though the touch member 72 is in continuous contact with the first region 20.

Figure 7:
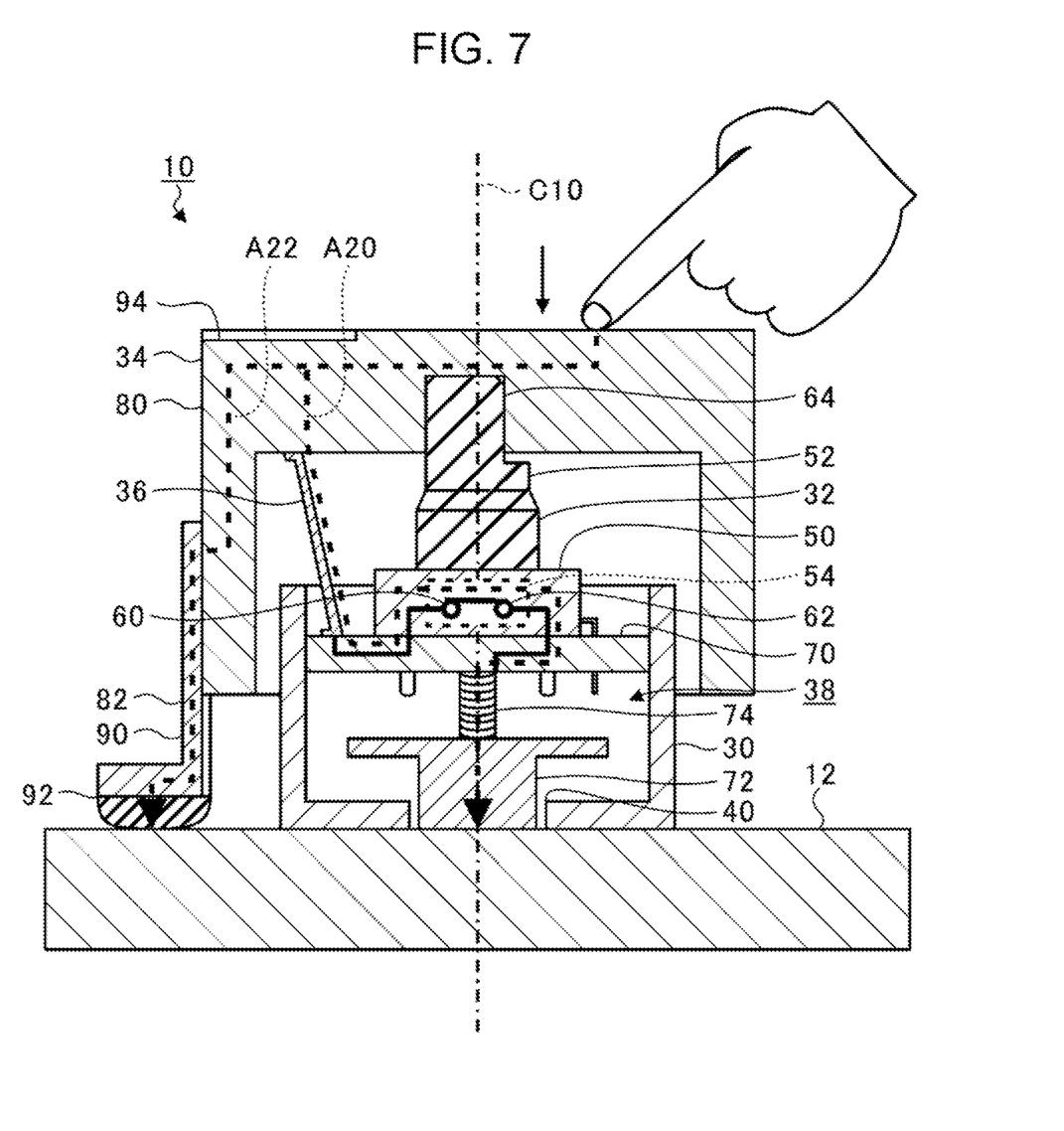
FIG. 7 is a longitudinal sectional view illustrating an effect when a push operation is performed on one of the switch simulation devices.

FIG. 7 is a longitudinal sectional view illustrating an effect when the push operation is performed on one of the switch simulation devices 10. FIG. 7 illustrates a case where a person performs the push operation by pushing the upper surface of the cover 80 of the operation member 34 downward by using their finger.

As described above, when the head 52 of the volume switch 32 is pushed in the direction in which the head 52 is inserted into the main body 50, the internal opening-and-closing unit 54 of the volume switch 32 is brought into the closed state. As illustrated in FIG. 7, when the internal opening-and-closing unit 54 of the volume switch 32 is in the closed state, the first region 20 of the touch panel 12 and the operation member 34 are in the conductive state.

When the person is in contact with the operation member 34 and the first region 20 of the touch panel 12 and the operation member 34 are brought into the conductive state by the internal opening-and-closing unit 54, a current path that is indicated by a dashed arrow A20 as an example in FIG. 7 is formed. In other words, the current path sequentially coupling the person, the cover 80, the contact terminal 36, the first contact point 60, the internal opening-and-closing unit 54, the second contact point 62, the biasing member 74, the touch member 72, and the first region 20 of the touch panel 12 to one another is formed. As a result, a change in electrostatic capacitance occurs in the first region 20 of the touch panel 12. In response to this, the touch panel 12 detects the push operation in response to the change in the electrostatic capacitance of the first region 20.

In addition, since the person is in contact with the operation member 34 when the person performs the push operation, the current path that is indicated by a dashed arrow A22 as an example in FIG. 7 is also formed. In other words, the current path sequentially coupling the person, the cover 80, the arm 90, the contact member 92, and the second region 22 of the touch panel 12 to one another is also formed. As a result, a change in the electrostatic capacitance occurs also in the part of the second region 22 of the touch panel 12. Therefore, the touch panel 12 may detect the push operation in response to occurrence of both a change in the electrostatic capacitance of the first region 20 and a change in the electrostatic capacitance of the part of the second region 22.

Note that, when a change in the electrostatic capacitance of the first region 20 and a change in the electrostatic capacitance of the part of the second region 22 both occur, the touch panel 12 may perform both detection of the push operation and detection of the rotation angle substantially in parallel.

When the pushing force applied to the operation member 34 is reduced, the operation member 34 and the head 52 move so as to return to their original positions before they are pushed, and the internal opening-and-closing unit 54 is switched from the closed state to the open state. As a result, the current path indicated by the dashed arrow A20 as an example in FIG. 7 is no longer formed. Consequently, the touch panel 12 does not detect the push operation.

As described above, each of the switch simulation devices 10 of the present embodiment includes the volume switch 32, the operation member 34, the contact terminal 36, and the first coupler 38. The volume switch 32 includes the main body 50, the head 52, and the internal opening-and-closing unit 54. The main body 50 has the first contact point 60 and the second contact point 62. The head 52 is configured to rotate relative to the main body 50 around the central axis of the main body 50 and to be movable relative to the main body 50 in the direction in which the central axis of the main body 50 extends. The internal opening-and-closing unit 54 is configured to electrically couple the first contact point 60 and the second contact point 62 to each other or electrically uncoupling the first contact point 60 and the second contact point 62 from each other. The operation member 34 is made of a material having electrical conductivity and coupled to the head 52 of the volume switch 32 so as to be rotatable and movable integrally with the head 52. The contact terminal 36 is made of a material having electrical conductivity and electrically coupled to the first contact point 60 of the volume switch 32. The contact terminal 36 is in continuous contact with the operation member 34 regardless of the rotation and the movement of the operation member 34. The first coupler 38 electrically couples the first region 20 of the touch panel 12 and the second contact point 62 of the volume switch 32 to each other.

Thus, in each of the switch simulation devices 10 of the present embodiment, the internal opening-and-closing unit 54 is opened and closed in response to the push operation performed on the operation member 34, and when the internal opening-and-closing unit 54 is brought into the open state, the first region 20 of the touch panel 12 and the operation member 34 are electrically coupled to each other. Compared to a comparative example in which a touch operation is detected by pressing an operation knob that is not in contact with the touch panel 12 against the touch panel 12 by performing the push operation, the touch operation can be more appropriately detected by the touch panel 12 in each of the switch simulation devices 10 of the present embodiment.

Therefore, in each of the switch simulation devices 10 of the present embodiment, the push operation that is performed on the switch simulation device 10 can be appropriately reflected on the touch panel 12, and deterioration in the response accuracy of the touch panel 12 can be suppressed.

In addition, the operation member 34 of each of the switch simulation devices 10 of the present embodiment includes the cover 80 and the second coupler 82. The cover 80 is mounted on the head of the volume switch 32 and disposed so as to cover the volume switch 32. The second coupler 82 is disposed so as to project from the cover 80 toward the touch panel 12 and electrically couples the part of the second region 22 of the touch panel 12 and the cover 80 to each other. When the operation member 34 rotates, the end of the second coupler 82 is maintained in contact with the second region 22 of the touch panel 12.

As a result, in each of the switch simulation devices 10 of the present embodiment, the touch panel 12 can detect the push operation performed on the switch simulation device 10, and in addition, the touch panel 12 can detect the rotation operation performed on the switch simulation device 10. As a result, for example, in a flight simulator, a control operation of an actual aircraft can be more accurately simulated with the switch simulation devices 10 of the present embodiment.

In addition, in each of the switch simulation devices 10 of the present embodiment, the end of the second coupler 82 is configured to be deformed in response to the movement of the operation member 34 in the central axis direction.

Consequently, in each of the switch simulation devices 10 of the present embodiment, even in a state where the second coupler 82 is in continuous contact with the part of the second region 22 of the touch panel 12, a situation in which the push operation is hindered can be avoided, and the push operation is not affected.

In addition, the first coupler 38 of each of the switch simulation devices 10 of the present embodiment includes the touch member 72 that is in continuous contact with the first region 20 of the touch panel 12. In each of the switch simulation devices 10 of the present embodiment, when the internal opening-and-closing unit 54 is in the open state, the first region 20 of the touch panel 12 and the operation member 34 are in the non-conductive state, and when the internal opening-and-closing unit 54 is in the closed state, the first region 20 of the touch panel 12 and the operation member 34 are in the conductive state.

Thus, in each of the switch simulation devices 10 of the present embodiment, the first coupler 38 is in continuous contact with the first region 20 of the touch panel 12, so that the electrical coupling between the first coupler 38 and the first region 20 of the touch panel 12 can be more reliably maintained. As a result, compared to the comparative example in which the touch operation is detected by pressing the operation knob, which is not in contact with the touch panel 12, against the touch panel 12 by performing the push operation, the touch operation can be more appropriately and reliably detected by the touch panel 12 in each of the switch simulation devices 10 of the present embodiment.

In addition, the first coupler 38 of each of the switch simulation devices 10 of the present embodiment includes the switch substrate 70, the touch member 72, and the biasing member 74. The switch substrate 70 is supported by the switch base 30, which is attached and fixed to the touch panel 12, and supports the volume switch 32. The touch member 72 is made of a material having electrical conductivity and is in continuous contact with the first region 20 of the touch panel 12. The biasing member 74 is made of a material having electrical conductivity and is disposed between the switch substrate 70 and the touch member 72. The biasing member 74 biases the touch member 72 in the direction in which the touch member 72 is pressed against the touch panel 12.

Thus, in each of the switch simulation devices 10 of the present embodiment, the touch member 72 can be more reliably brought into continuous contact with the touch panel 12 by the biasing member 74, and electrical coupling between the second contact point 62 of the volume switch 32 and the touch panel 12 can be more reliably maintained.

Although the embodiment of the disclosure has been described above with reference to the accompanying drawings, the disclosure is not limited to the embodiment. It is obvious that those skilled in the art can conceive various modifications or corrections within the scope described in the claims, and it is to be understood that such modifications or corrections are naturally included in the technical scope of the disclosure.

Note that, in the above-described embodiment, a case has been described in which the operation panel in which the switch simulation devices 10 are attached to the touch panel 12 is used as the operation panel of the flight simulator. However, the switch simulation devices 10 are not limited to be applied to the flight simulator and can be applied to any operation device that includes the touch panel 12.

In addition, in the above-described embodiment, a case has been described in which the switch simulation devices 10 are each applied as a simulation device of a rotary switch that is capable of detecting the push operation and the rotation operation. However, the disclosure is not limited to this case, and the switch simulation devices 10 can each be applied as a simulation device of other various switches. For example, the configuration for detecting the rotation operation may be omitted, and the switch simulation devices 10 can each be applied as a device that simulates a push switch, a tactile switch, or the like capable of detecting the push operation.

According to the disclosure, deterioration in response accuracy of a touch panel can be suppressed.

For example, Japanese Unexamined Patent Application Publication (JP-A) No. 2016-218542 describes a technology for enabling an operation of a touch panel by operating a switch simulation device that is attached to a surface of the touch panel and that simulates a physical switch. In such a technology, when a push operation is performed on an operation knob that is not in contact with a touch panel, the operation knob moves in a direction toward the touch panel, and an end of the operation knob presses a surface of the touch panel, thereby causing the touch panel to detect a touch.

An aspect of the disclosure provides a switch simulation device attachable to a touch panel. The switch simulation device includes a volume switch, an operation member, a contact terminal, and a first coupler. The volume switch includes a main body, a head, and an internal opening-and-closing unit. The main body includes a first contact point and a second contact point. The head is configured to rotate relative to the main body around a central axis of the main body and so as to move relative to the main body in a direction in which the central axis of the main body extends. The internal opening-and-closing unit is configured to electrically couple and uncouple the first contact point and the second contact point in response to movement of the head in the direction in which the central axis extends. The operation member includes a material having electrical conductivity and is coupled to the head of the volume switch to be rotatable and movable integrally with the head. The contact terminal includes a material having electrical conductivity and is configured to be electrically coupled to the first contact point of the volume switch. The contact terminal is in continuous contact with the operation member regardless of rotation of the operation member and movement of the operation member. The first coupler is configured to electrically couple a first region of the touch panel and the second contact point of the volume switch.

Obviously, numerous modifications and variations of the present invention are possible in light of the above teachings. It is therefore to be understood that within the scope of the appended claims, the invention may be practiced otherwise than as specifically described herein.

The invention claimed is:

1. A switch simulation device attachable to a touch panel, comprising:
   a volume switch comprising a main body, a head, and an internal opening-and-closing unit;
   an operation member comprising a material having electrical conductivity and coupled to the head of the volume switch;
   a contact terminal comprising a material having electrical conductivity and configured to be electrically coupled to a first contact point of the volume switch; and
   a first coupler configured to electrically couple a first region of a touch panel and a second contact point of the volume switch,
   wherein the main body of the volume switch has the first contact point and the second contact point, the head of the volume switch is configured to rotate relative to the main body around a central axis of the main body and move relative to the main body in a direction in which the central axis of the main body extends, the internal opening-and-closing unit of the volume switch is configured to electrically couple and uncouple the first contact point and the second contact point in response to movement of the head in the direction in which the central axis extends, the operation member is configured to rotate and move integrally with the head, the contact terminal is in continuous contact with the operation member regardless of rotation of the operation member and movement of the operation member, the operation member comprises a cover mounted on the head of the volume switch and disposed so as to cover the volume switch, and a second coupler disposed so as to project from the cover toward the touch panel and configured to electrically couple a part of a second region of the touch panel and the cover to each other, the second region is around the first region and having an annular shape, and an end of the second coupler is configured to be maintained in contact with the second region of the touch panel when the operation member rotates.

2. The switch simulation device according to claim 1, wherein the end of the second coupler comprises a material having electrical conductivity and flexibility, the end of the second coupler is configured to be deformed in response to movement of the operation member in the direction in which the central axis extends.

3. The switch simulation device according to claim 1, wherein the first coupler comprises a touch member in continuous contact with the first region of the touch panel, the first region of the touch panel and the operation member are configured to be in a non-conductive state when the internal opening-and-closing unit is in an open state, and the first region of the touch panel and the operation member are configured to be in a conductive state when the internal opening-and-closing unit is in a closed state.

4. The switch simulation device according to claim 1, wherein the first coupler comprises a switch substrate supported by a switch base, the switch base is attached and fixed to the touch panel, and supporting the volume switch, a touch member comprises a material having electrical conductivity, the touch member is in continuous contact with the first region of the touch panel, and a biasing member comprises material having electrical conductivity and disposed between the switch substrate and the touch member, the biasing member is configured to bias the touch member in a direction in which the touch member is pressed against the touch panel, and the switch substrate has an electrical path configured to electrically couple the second contact point of the volume switch and the biasing member to each other.

5. The switch simulation device according to claim 2, wherein the first coupler comprises a touch member in continuous contact with the first region of the touch panel, the first region of the touch panel and the operation member are configured to be in a non-conductive state when the internal opening-and-closing unit is in an open state, and the first region of the touch panel and the operation member are configured to be in a conductive state when the internal opening-and-closing unit is in a closed state.

6. The switch simulation device according to claim 2, wherein the first coupler comprises a switch substrate supported by a switch base, the switch base is attached and fixed to the touch panel, and supporting the volume switch, a touch member comprises a material having electrical conductivity, the touch member is in continuous contact with the first region of the touch panel, and a biasing member comprises material having electrical conductivity and disposed between the switch substrate and the touch member, the biasing member is configured to bias the touch member in a direction in which the touch member is pressed against the touch panel, and the switch substrate has an electrical path configured to electrically couple the second contact point of the volume switch and the biasing member to each other.

7. A switch simulation device attachable to a touch panel, comprising:
   a volume switch comprising a main body, a head, and an internal opening-and-closing unit;
   an operation member comprising a material having electrical conductivity and coupled to the head of the volume switch;
   a contact terminal comprising a material having electrical conductivity and configured to be electrically coupled to a first contact point of the volume switch; and
   a first coupler configured to electrically couple a first region of a touch panel and a second contact point of the volume switch,
   wherein the main body of the volume switch has the first contact point and the second contact point, the head of the volume switch is configured to rotate relative to the main body around a central axis of the main body and move relative to the main body in a direction in which the central axis of the main body extends, the internal opening-and-closing unit of the volume switch is configured to electrically couple and uncouple the first contact point and the second contact point in response to movement of the head in the direction in which the central axis extends, the operation member is configured to rotate and move integrally with the head, the contact terminal is in continuous contact with the operation member regardless of rotation of the operation member and movement of the operation member, the first coupler comprises a touch member in continuous contact with the first region of the touch panel, the first region of the touch panel and the operation member are configured to be in a non-conductive state when the internal opening-and-closing unit is in an open state, and the first region of the touch panel and the operation member are configured to be in a conductive state when the internal opening-and-closing unit is in a closed state.

8. A switch simulation device attachable to a touch panel, comprising:
   a volume switch comprising a main body, a head, and an internal opening-and-closing unit;
   an operation member comprising a material having electrical conductivity and coupled to the head of the volume switch;
   a contact terminal comprising a material having electrical conductivity and configured to be electrically coupled to a first contact point of the volume switch; and
   a first coupler configured to electrically couple a first region of a touch panel and a second contact point of the volume switch,
   wherein the main body of the volume switch has the first contact point and the second contact point, the head of the volume switch is configured to rotate relative to the main body around a central axis of the main body and move relative to the main body in a direction in which the central axis of the main body extends, the internal opening-and-closing unit of the volume switch is configured to electrically couple and uncouple the first contact point and the second contact point in response to movement of the head in the direction in which the central axis extends, the operation member is configured to rotate and move integrally with the head, the contact terminal is in continuous contact with the operation member regardless of rotation of the operation member and movement of the operation member, the first coupler comprises a switch substrate supported by a switch base, the switch base is attached and fixed to the touch panel, and supporting the volume switch, a touch member comprises a material having electrical conductivity, the touch member is in continuous contact with the first region of the touch panel, and a biasing member comprises material having electrical conductivity and disposed between the switch substrate and the touch member, the biasing member is configured to bias the touch member in a direction in which the touch member is pressed against the touch panel, and the switch substrate has an electrical path configured to electrically couple the second contact point of the volume switch and the biasing member to each other.

* * * * *